(12) United States Patent
Harris

(10) Patent No.: US 8,684,271 B2
(45) Date of Patent: Apr. 1, 2014

(54) COMPOSITE LABEL WITH HISTORY FEATURE

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 444 days.

(21) Appl. No.: 12/565,128

(22) Filed: Sep. 23, 2009

(65) Prior Publication Data

US 2011/0068177 A1    Mar. 24, 2011

(51) Int. Cl.
*G06K 7/10* (2006.01)
(52) U.S. Cl.
USPC ............... 235/492; 235/462.01; 235/487
(58) Field of Classification Search
USPC ............ 235/492, 487, 380, 379, 462.16, 235/462.19, 462.25, 437, 462.01, 462.06, 235/462.1, 462.29, 438
See application file for complete search history.

(56) References Cited

U.S. PATENT DOCUMENTS

| | | | |
|---|---|---|---|
| 6,666,377 B1 | 12/2003 | Harris | |
| 2003/0230630 A1* | 12/2003 | Whipple et al. | 235/462.01 |
| 2004/0255081 A1* | 12/2004 | Arnouse | 711/115 |
| 2006/0091223 A1* | 5/2006 | Zellner et al. | 235/492 |
| 2006/0118619 A1* | 6/2006 | Hulst et al. | 235/380 |
| 2008/0303637 A1* | 12/2008 | Gelbman et al. | 340/10.42 |
| 2009/0145970 A1* | 6/2009 | Gardner et al. | 235/492 |

* cited by examiner

*Primary Examiner* — Michael G Lee
*Assistant Examiner* — Tabitha Chedekel
(74) *Attorney, Agent, or Firm* — Law Office of Scott C. Harris, Inc.

(57) ABSTRACT

A code that stores a history of what has been done to it and where it has been. The history can be stored in a local memory. The code can be changed based on that history.

20 Claims, 2 Drawing Sheets

COMPOSITE LABEL WITH HISTORY FEATURE

BACKGROUND

Barcodes have been used for many purposes, including checkout at a check stand, and for tracking packages and inventory.

My U.S. Pat. No. 6,666,377 describes other uses for a barcode, including personal identification.

Barcodes and other optical indicia are read optically. Information can be obtained remotely and non-optically using RF techniques such as RFID.

SUMMARY

The present application describes a combined multifunction remotely-detectable code and apparatus.

In different embodiments, the indicia can be for example, a bar-code, and/or an RFID device, and/or another RF device, and/or an optical signal device.

According to an embodiment, electronic circuits are placed within an area of the barcode.

Another embodiment describes a combined optically-readable code along with an electronic code portion, which stores information about the history of interfacing with the code, including the optically-readable code.

DETAILED DESCRIPTION

Figure 1:
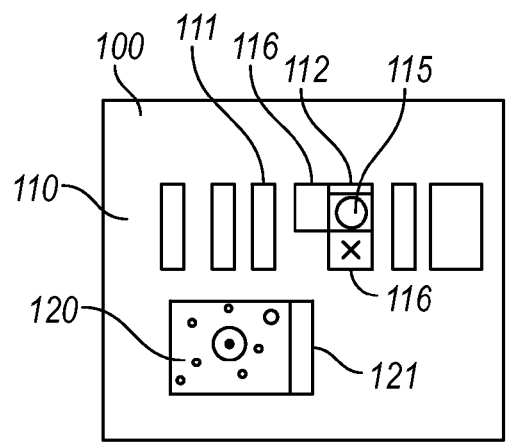
FIG. 1 shows a first embodiment of a combined optical and electrical code.

FIG. 1 illustrates an embodiment with a substrate 100 with codes thereon. The substrate can be a label, or a card, such as an ID card, credit card etc; or it can be any other substrate. The substrate has an optically readable code thereon. That code is described in a first embodiment as being a barcode, however, it can be any code that can be read optically, e.g., an OCR code, or a MICR code, or other optically viewable codes.

A first bar-code part 110 forms a first part of an overall bar-code. The first bar-code part 110 includes light areas 111 separated by dark areas 112, e.g., as formed in a one dimensional barcode, such as a UPC code or other one dimensional barcode. The first barcode part 110 is shown as a one-dimensional bar-code where the information is encoded in a single direction. However, it should be understood that this barcode part 110 can also be two dimensional, for example, if the substrate 100 is located on a curved surface such as the outer surface of a can.

In an embodiment, one or more of the areas 111, 112 also includes an alternative sensor therein. In this embodiment, the area 112 includes an RFID device 115 that is located in the area of the dark portion of the barcode. The RFID device 115 may itself have an outer surface which is also dark, so that when scanned, the outer surface looks dark to the optical scanner.

The area 112 may also have a photocell 116 therein which may be configured as described herein. Other areas of the substrate 100 may also have other parts therein. For example, the white space area 111 between the dark bars forming the barcode, may include a WiFi or cellular receiver, that is either powered by its own power source, or from an alternative power source.

The substrate 100 may also include a second barcode portion thereon, here shown as a two-dimensional (2-D) barcode 120. The two barcode portions 110, 120 together form a composite information reading part or a composite barcode.

The 2-D bar-code portion 120 may also include an electronic associated part 121. The electronic associated part 121 may be an RFID device, or any other device which is capable of wirelessly communicating information.

One advantage of this device is that both a barcode and a wireless communication part such as a RFID device can both be located in the same physical area. For example, in the barcode portion 110, the barcode and the wireless communication device are located as part of the barcode. The circuitry, therefore does not take up any extra space on the substrate, since it is placed on the substrate.

This produces the unexpected advantage of there being greater capability in the same amount of space. In addition, however, this creates another advantage that the electronic devices can obtain information associated with the reading of the optical devices.

I realize that a barcode may be read many times. However, the reading of the barcode is optical, that is a conventional barcode does not "know" that is has been read. A barcode does not maintain any kind of history of it having been read. My U.S. Pat. No. 6,666,377 describes that the information read can be sent to a database, so that the database has information indicative of the barcode having been read. An embodiment describes an optically readable code, where a part associated with that optically readable code stores a history of the optically readable code; where that history can include various information including when the device is scanned, where it is, and other information.

The history as described herein includes at least one item of data, and preferably more than one such item, about the past history of the item. That history can indicate where the item has been, and what has been done to the item. For example, when used in tracking a package, a scan is often taken of the barcode, and sent to a remote database for processing. In this way, when one looks at the package's history, one can easily tell where the package has been and when the determination was made. In the prior art, a machine associated with a barcode reader has sent the data to a database, from which that data has been read.

During the tracking process, an item can be located in many locations where it is not scanned. Also during the tracking process, items may be scanned by scanners that either do not send the data to a database, or have not yet sent that data. Moreover, the inventor recognizes that this causes a basic disconnect—the database knows where the package is and has been—but the package does not know that.

In this embodiment, however, by placing an electronic memory, e.g., with a wireless communication device, associated with the optically-scannable code—the wireless communication device stores its own history. In one embodiment, the memory and communication device is stored on the same substrate that receives the optical device between elements of the barcode.

In an embodiment, the wireless communication device can communicate with the remote network, but circuitry associated with the device can also store history information.

Figure 2:
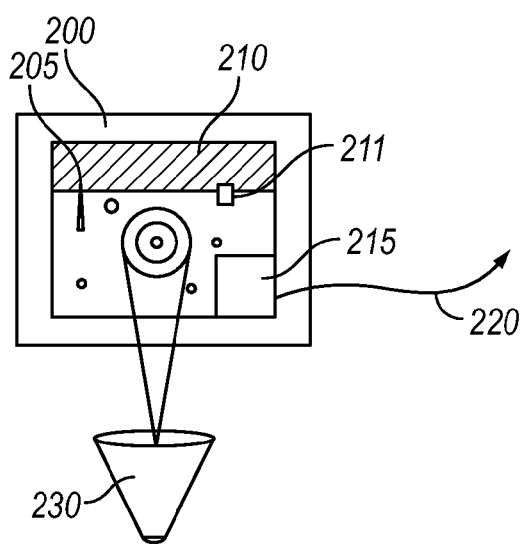
FIG. 2 shows a scanning system.

FIG. 2 illustrates an embodiment. A substrate 200 includes a barcode thereon which may include two parts: 1-D part and a 2-D part. The system also includes an RFID device 210, and a Bluetooth device 215. The RFID device includes an associated photocell 211. When a scanner 230 scans the barcode, the scan is detected by the photocell 211. For example, the photocell may be sensitive only to a specific frequency or type of light that is emitted by the scanner. As one example, the photocell may sense the characteristic "red" scan line that is used by some barcode scanners.

The photocell 211 therefore detects the scan, and indicates to the RFID unit 210 that the barcode (which itself is wholly passive) has been scanned. In addition or alternatively, the photocell may indicate to the WiFi module 215 or to the memory, that the barcode has been scanned.

Either the RFID device 210 or the WiFi module 215 or both produce a wireless signal 220 which may be an encrypted signal. A wireless signal may include either a timestamp, or may be a contemporaneous signal, and may indicate that the barcode has been scanned. The wireless signal may also indicate everything that is known about the scans and/or locations, including what time it is when scanned, where it is, and any information about the scan itself, e.g., what kind of scanner is used for the scan.

Figure 3:
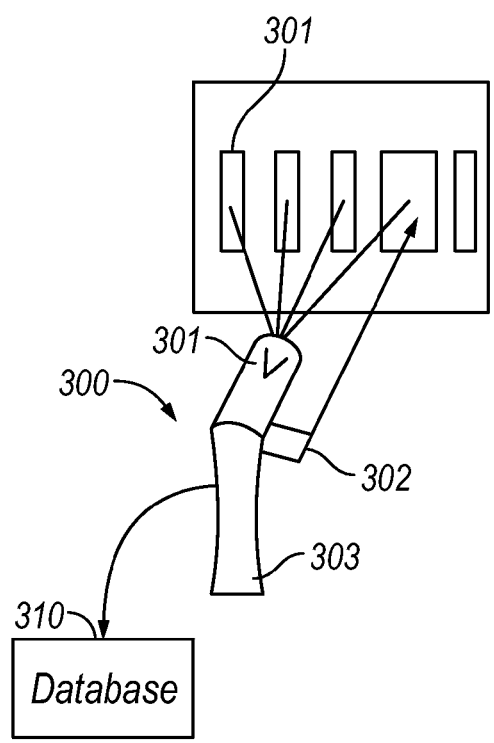
FIG. 3 shows a scanning and communication to a database.

According to another embodiment, shown in FIG. 3, 300 is a reader of both barcode information such as 301 and also of wireless communication e.g. from an RFID unit or other short range communication device. The reader 300 includes a barcode scanning part 301 and RFID scanning part 302 which receives information from the RFID. The reader has a memory 303 which stores information about the scanned information. The reader may send this information wirelessly to a database 310, either in real time as received, or based on a poll, or periodically.

According to another embodiment, the code, which can be a passively readable code, has a memory that stores information. In the embodiment above, this memory may store information each time that the code is actually scanned, for example, or may store it only some times when the code is scanned.

Figure 4:
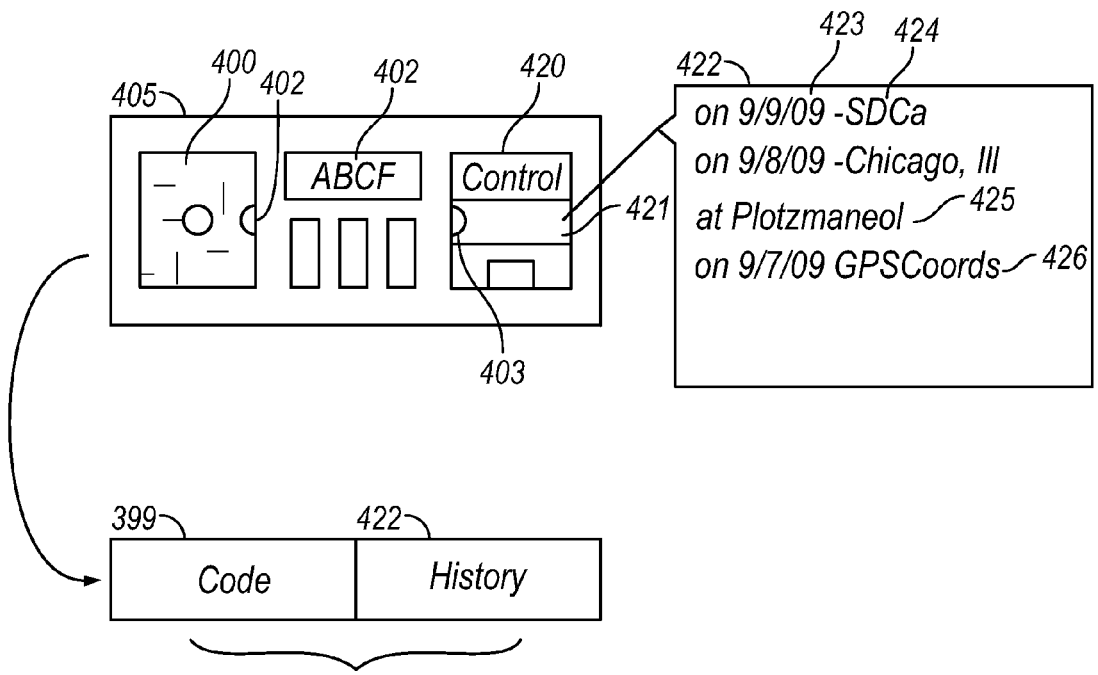
FIG. 4 shows an exemplary label layout with history.

In this embodiment, for example, FIG. 4 shows that there may be readable parts such as a two-dimensional barcode 400, a one-dimensional bar-code 405, and another readable code such as, for example, an OCR code or a MICR code. Each of these items may include either a photocell such as 402, or there can be a photocell such as 403 associated with the code as a whole. Each time that the code is read, the fact that the code has been read is communicated to a control part 420 which may include a sensor or any kind of active determination device. The sensor can produce an output, for example, indicating that it has been scanned. The control 420 can include any of the parts in the previously described embodiments or any of those in the other embodiments described herein. Moreover, the control part can be located within one of the "bars" of the 1-D or 2-D bar-code. The control part can be located within the "dead space" area of either of the barcodes, as an alternative embodiment.

In this embodiment, the control portion stores a history of the substrate with the code (which may, for example, be a package), e.g., where it was, what scanned it, and when that scan occurred.

422 for example illustrates the data that may be stored in this history. This may include the date such as 423. The history may include location information—e.g., geographical information such as 424. This can include longitude/latitude information. It can include a specific place information with a name and/or other unique identifier, e.g., "PlatsmansEO1", or any other kind of information. This can use any kind of location determination device. For example, it can be a GPS device, or cellular device that detects location from information received over the cellular network, e.g., by detecting which cell station is closest to the unit.

The location can be obtained in one embodiment, for example, from the GPS unit on the device, and saved at the time of scanning. In another embodiment, such as the embodiment of FIG. 3, the information may be obtained from the scanner device itself 303. The GPS coordinates are shown as 426.

Another embodiment may save GPS or location coordinates at specified intervals, e.g., every hour, or any time that the location changes by more than a specified amount.

When scanned by a fully active device, the device can obtain any information from any or all of the codes 400, 405, and or 420, shown as the code scan 399. Appended to that, however, is the history of scans 422, as stored in the controller. This may be provided wirelessly, in one embodiment. According to another embodiment, the controller 420 may include an electrooptical device such as a liquid crystal display 421 that creates a bar-code that is encoded to include some or all of this history information, or other optically readable code. This optically readable code can be modified to include the history information so that the reading of the optically readable code reads the history information. In one embodiment, this liquid crystal display can be always on, but not backlit. Liquid crystals use very little energy when in their static state. Another embodiment may turn on the liquid crystal for a reading period of time, e.g., 10 minutes, responsive to detecting a scan indication. Other optical displays can be used, for example, pixellated LEDs or plasma displays or any other display that can be electrically altered.

The scan indication can be the red scanning line from the scanner, as in the above. In another embodiment, the scanner may communicate via an RF signal or some other signal prior to scanning.

Figure 5:
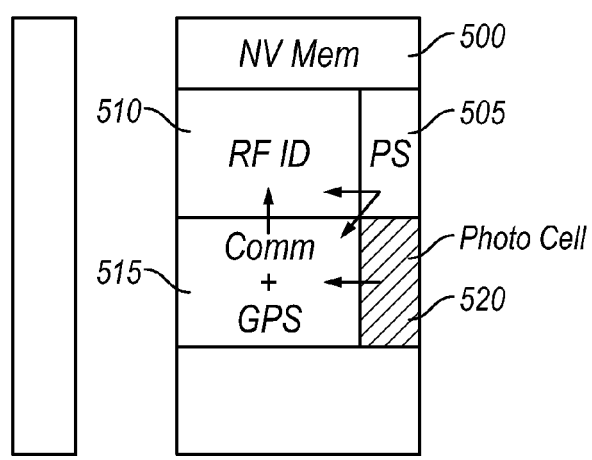
FIG. 5 shows a hardware layout.

FIG. 5 illustrates an exemplary layout of the control device for either the embodiment of FIG. 4 or for the embodiments of any of the previous FIGS. 1 through 3. In this embodiment, the control device may be located within the confines of a barcode portion. In the embodiment, the element includes at different geometrical locations, a nonvolatile memory, that stores the information such as that described above. A power supply 505 may power all of the circuits on the device. An RFID unit 500 and may be powered by the power supply 505, or may be totally passive or may include its own power supply. A communication unit 512 may include the ability to communicate via WiFi, low-level cellular, or optical. The communication unit may also include a GPS or other location device that automatically determines its location. Part of the device may also be a photocell 520, that may charge the power supply 505 through optical radiation, and may also serve to detect when the bar codes are scanned by detecting the signature of a scanner.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of codes can be modified in an analogous way.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising:
a substrate, having an optically readable code thereon, where said optically readable code is visible on a surface of the substrate and is readable by an external optical reading device that optically views the surface of the substrate, and said substrate also having a memory that stores information about a history of viewing of said optically readable code from said substrate by said external reading device; and a sensor sensing an emission from said external reading device, and using said sensing the emission to determine that the optically readable code has been read.

2. A system as in claim 1, wherein said sensor includes a photocell sensing the emission from said external reading device.

3. A system as in claim 1, wherein said optically readable code is a read-only barcode that cannot be electronically changed.

4. A system as in claim 1, wherein said memory causes changes to said optically readable code.

5. A system, comprising:
a substrate, having an optically readable code thereon that is visible on a surface of the substrate and is readable by an external optical reading device that optically views the surface of the substrate, and said substrate also having a memory that stores a timestamp indicating when said optically readable code was optically viewed by said external reading device; and a sensor that senses an emission from said external reading device in order to determine when said optically readable code has been read.

6. A system as in claim 5, further comprising a location detecting part, associated with said substrate, and wherein said memory stores information about a location of said substrate, wherein said memory stores said information about said location when said optically readable code is optically viewed by said external reading device.

7. A system as in claim 5, wherein said sensor includes a photocell sensing the emission from said external reading device.

8. A method comprising:
showing an optically readable code that is visible on a visible surface of a substrate;
sensing that said optically readable code has been viewed by an external reading device that optically views the visible surface of the substrate by sensing when said optically readable code is read by said external reading device by sensing an emission from said external reading device; and
storing information about a history of viewing of said optically readable code from said substrate by said external reading device, in a memory associated with said substrate.

9. A method as in claim 8, wherein said information about the history of viewing includes at least a timestamp indicating a time when the optically readable code was read and a location where the substrate was located when the optically readable code was read and information about a specific reading device that read said optically readable code.

10. A method as in claim 9, where said optically readable code is visible on a surface of the substrate and is readable by an external optical reading device that optically views the surface of the substrate, and said information is stored based on said external optical reading device optically viewing the surface.

11. A method as in claim 8, wherein said storing information about said history includes all of a timestamp indicating a time when the optically readable code was read and a location where the substrate was located when the optically readable code was read and also information about a specific reading device that read said optically readable code .

12. A method as in claim 8, wherein said sensing comprises sensing using a photocell for sensing the emission from said external reading device.

13. A method as in claim 8, wherein said storing information comprises changing the optically readable code that is shown on said substrate according to said information about said history.

14. A method, comprising:
displaying an optically readable code that is visible on a surface of a substrate and is readable by an external optical reading device that optically views the surface of the substrate;
detecting the optically readable code being read by the external optical reading device viewing said surface; and
changing the display of said optically readable code that is visible on said surface based on said reading of said optically readable code by the external reading device; and
detecting a location of said code, and said changing said display is based on all of a timestamp indicating a time when the optically readable code was read and a location where the substrate was located when the optically readable code was read and information about a specific reading device that read said optically readable code.

15. A method as in claim 14, wherein the detecting uses a photocell.

16. A method as in claim 14, wherein said code is a barcode.

17. An apparatus comprising:
a display, displaying an optically readable code that is visible on the display;
a sensor, detecting the optically readable code being read by an external optical reading device viewing said display; and
a processor, changing the display of said optically readable code on said display based on said read of said optically readable code by said external optical reading device and said changing said display including changing based on all of a timestamp indicating a time when the optically readable code was read and a location where the optically readable code was located when the optically readable code was read and information about a specific reading device that read said optically readable code.

18. A method as in claim 17, wherein the detecting uses a photocell.

19. A method, comprising:
displaying an optically readable code that is visible on a surface of a substrate and is readable by an external optical reading device that optically views the surface of the substrate;
detecting the optically readable code being read by the external optical reading device viewing said visible surface; and
changing the display of said optically readable code that is visible on said visible surface based on said reading of said optically readable code by the external reading device, wherein said detecting further comprises sensing an emission from said external reading device in order to determine that the optically readable code has been read.

20. An apparatus comprising:
a display, displaying an optically readable code that is visible on the display;
a sensor, detecting the optically readable code being read by an external optical reading device viewing said display; and
a processor, changing the display of said optically readable code on said display based on said read of said optically readable code by said external optical reading device, wherein said detecting further comprises sensing an emission from said external reading device in order to determine that the optically readable code has been read.

* * * * *